United States Patent
Lemphers et al.

(10) Patent No.: US 10,922,710 B2
(45) Date of Patent: *Feb. 16, 2021

(54) MATCHING A COUPON TO A SPECIFIC PRODUCT

(71) Applicant: RetailMeNot, Inc., Austin, TX (US)

(72) Inventors: David Jonathan Lemphers, Kirkland, WA (US); Shreyas Karnik, Redmond, WA (US); Christopher Couhault, Los Altos, CA (US); Alexandras Suvacioglu, Menlo Park, CA (US)

(73) Assignee: RETAILMENOT, INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/751,040

(22) Filed: Jan. 23, 2020

(65) Prior Publication Data
US 2020/0234324 A1 Jul. 23, 2020

Related U.S. Application Data

(63) Continuation of application No. 13/844,395, filed on Mar. 15, 2013, now Pat. No. 10,592,915.

(51) Int. Cl.
*G06Q 30/02* (2012.01)

(52) U.S. Cl.
CPC ..... *G06Q 30/0225* (2013.01); *G06Q 30/0222* (2013.01); *G06Q 30/0235* (2013.01); *G06Q 30/0239* (2013.01); *G06Q 30/0248* (2013.01); *G06Q 30/0253* (2013.01); *G06Q 30/0277* (2013.01)

(58) Field of Classification Search
CPC ............. G06Q 30/0255; G06Q 30/0207–0277
See application file for complete search history.

(56) References Cited

U.S. PATENT DOCUMENTS

| 10,592,915 B2 * | 3/2020 | Lemphers | G06Q 30/0235 |
| 2012/0017274 A1 * | 1/2012 | Schrecker | G06F 21/577 |
| | | | 726/22 |
| 2013/0332253 A1 * | 12/2013 | Shiffert | G06Q 30/0225 |
| | | | 705/14.26 |
| 2015/0287046 A1 * | 10/2015 | Richards | G06Q 30/0185 |
| | | | 705/26.35 |

(Continued)

OTHER PUBLICATIONS

Automatic extraction and provision of coupon codes for online shopping, IP.com Prior Art Database Technical Disclosure, IPCOM000257141D, IP.com Electronic Publication Date: Jan. 16, 2019 IP.*

(Continued)

*Primary Examiner* — David J Stoltenberg
(74) *Attorney, Agent, or Firm* — Womble Bond Dickinson (US) LLP

(57) ABSTRACT

A computer-implemented method, a system and a computer program product for processing third party online coupons. According to one embodiment, a third-party online coupon is received. Text is parsed to determine a merchant's website. The third-party online coupon description is parsed to determine a product term. The product term is searched for. The third-party online coupon is tested with a product associated with the product term. The third-party online coupon is determined if valid with the product.

30 Claims, 4 Drawing Sheets

(56) References Cited

U.S. PATENT DOCUMENTS

2015/0324788 A1* 11/2015 Graylin ............... G06Q 20/385
                                                      705/67
2016/0350785 A1* 12/2016 Chu .................. G06Q 30/0222

OTHER PUBLICATIONS

System and Method for Efficient Coupon Search on a PAMMCompliant Coupon Portal, An IP.com Prior Art Database Technical Disclosure, IP.com No. IPCOM000225757D, IP.com Electronic Publication Date: Mar. 4, 2013.*

What's Next for Shopbots?, Wan et al., Computer Perspectives, Published by the IEEE Computer Society, 2010 IEEE.*

* cited by examiner

MATCHING A COUPON TO A SPECIFIC PRODUCT

CROSS-REFERENCE TO RELATED APPLICATIONS

The present patent is a continuation of U.S. patent application Ser. No. 13/844,395, filed Mar. 15, 2013, having the same title, the entire content of which is hereby incorporated by reference.

BACKGROUND

Online shopping has brought a wide range of societal benefits, such as wider selections, lower prices, and the comfort of shopping from home and having items delivered at the click of a mouse. As online shopping becomes more popular, these benefits accumulate, not only in terms of higher efficiency, but also in terms of improved customer experience.

Challenges remain, however, for both consumers and merchants. Online shopping differentiates itself from shopping in stores by focusing on better prices and a lower hassle shopping experience. There is a concern that customers may be confused by hard to navigate websites, and when a customer attempts to use a website and is rejected, the fear that this customer may be lost, possibly for an extended period of time, becomes especially acute.

Online shopping remains a vibrant and competitive part of the economy, in part because it is so easy for shoppers to move between competing websites. Therefore, there remains a strong need to deliver better prices and a less frustrating experience for customers.

BRIEF SUMMARY

Embodiments of the invention include a computer-implemented method, a system and a computer program product for processing a third-party online coupon. According to one embodiment, a third-party online coupon is received. Text is parsed to determine a merchant's website. The third-party online coupon is parsed to determine a product term. The product term is searched for. The third-party online coupon is tested with a product associated with the product term. The validity of the third-party online coupon with the product is determined.

According to another embodiment, a system for processing online coupons, comprises a database, stored on a non-transitory computer readable medium, of third-party online coupons. There is a database, stored on a non-transitory computer readable medium, of third-party online coupon validation results. There is a database, stored on a non-transitory computer readable medium, of graphs of merchant websites. There is a coupon validator, coupled to the database of third party online coupons, the database of online coupon validation results and the database of graphs, configured to validate third party online coupons with products associated with a product term in a respective third party online coupon.

According to another embodiment, an article of manufacture including a computer-readable medium, including a third party online coupon, a parsed description of what the third party online coupon covers, and evidence that the third party online coupon has been verified for a product associated with the parsed description.

Further embodiments, features, and advantages of the invention, as well as the structure and operation of the various embodiments of the invention are described in detail below with reference to the accompanying drawings.

BRIEF DESCRIPTION OF THE DRAWINGS/FIGURES

The accompanying drawings, which are incorporated herein and form a part of the specification, illustrate embodiments of the invention and, together with the description, further serve to explain the principles of the invention and to enable a person skilled in the relevant art to make and use the invention.

Figure 1:
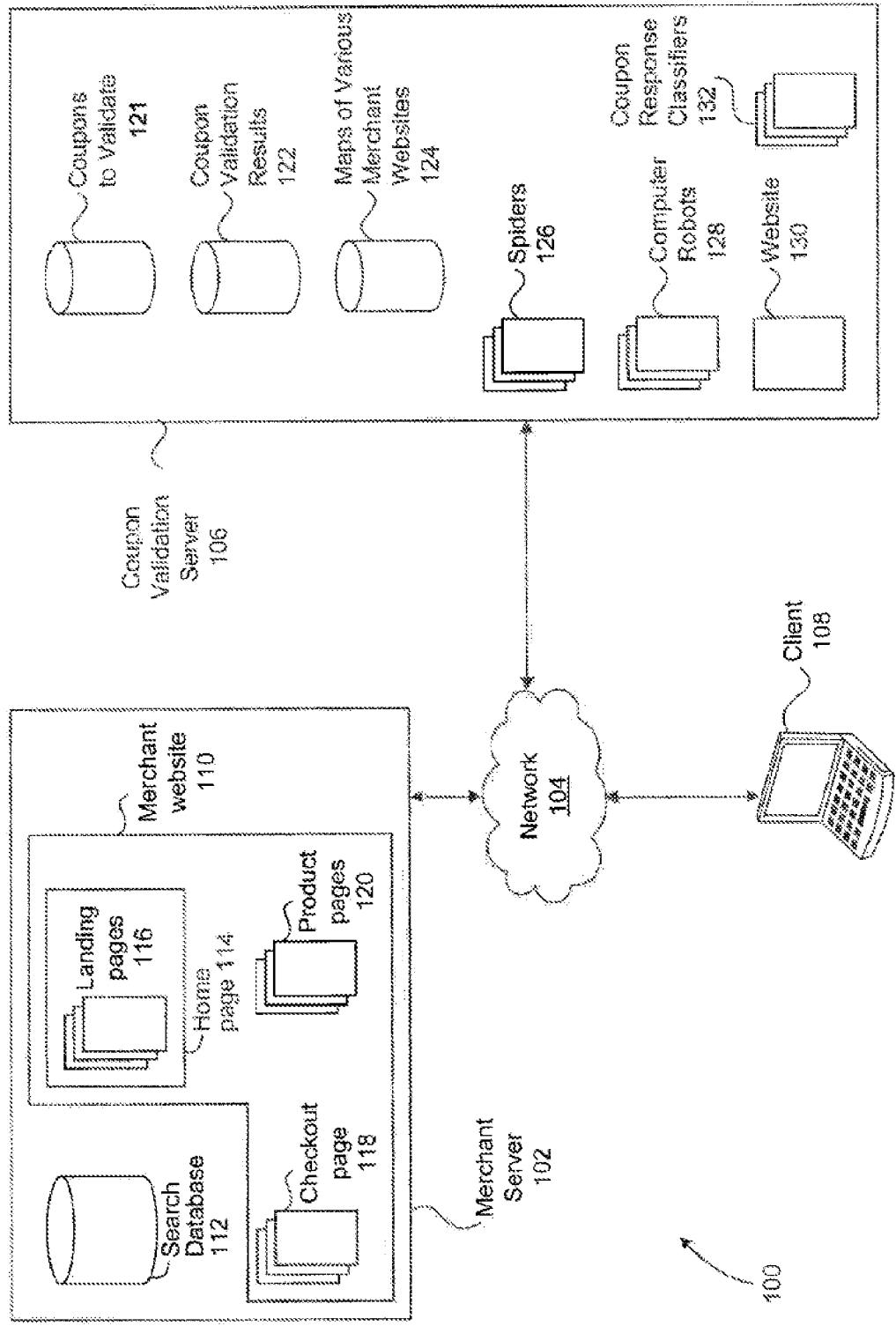
FIG. 1 is a block diagram of a networked environment, according to an embodiment.

The invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION OF EMBODIMENTS

The following detailed description refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

Coupons are a well understood technique to entice customers to a store. With the advent of computers and databases, coupons have become more powerful for merchants as the merchants can learn more about the behavior of the customers who use coupons, and can better target the coupons to offer their customers promotions that they will want.

However, online coupons have proven a uniquely frustrating experience because where printed coupons have the "fine print" on them detailing deadlines, exclusions and other restrictions, online coupons are often separated from these details. Online coupons are often entered with a code, such as JULY4SALE when checking out from a merchant. Online coupons are thus often stored and shared as merely the information needed to receive the discount. In turn, this means that potential customers cannot learn if an online coupon is valid until they are trying to check out. Merchants are concerned that rejecting a customer just as they are about to complete their purchase will not only dissuade the customer from making the purchase, it may alienate them over the longer term.

Conversely, customers know that they can save a significant amount of aggravation by using coupons that they know to be valid. Therefore, a system that notifies potential customers of valid coupons in advance of checking out would be welcome by both merchants and shoppers. Further, the more information can be provided before checking out, the better the customer will understand their options and the happier they are likely to be.

In this specification, the term "coupon" is to be interpreted broadly. "Coupon" is intended to encompass promotion codes, discount codes, referring links that entitle a shopper to improved treatment, such as a discount or a free item with purchase or other distributable information that can entice a shopper to a merchant via improved treatment. "Coupon" further includes deals, sales and other promotions, even where a customer does not need to present a code, piece of paper or other item.

An "online" coupon refers to a coupon that is submitted electronically, such as a promotion code. Online coupons can be distributed on paper, such as a mailing that instructs shoppers to enter a code, or visit a particular website.

A "third party" coupon refers to one that is distributed or otherwise interacted with by a party other than the issuer and the customer. If Macy's were to host coupons for its stores on macys.com, these would not be third party coupons. If that same coupon were hosted at zendeals.com, it would be a third party coupon because zendeals.com is not part of Macy's.

"Product" includes products and services, and is to be interpreted broadly. "Merchant" is also a broad term, and includes retailers and websites that a shopper might visit. Marketplaces, such as amazon.com and ebay.com are examples of merchants, as are independent operators who sell through amazon.com or ebay.com.

A "web interface" includes a webpage, a website, an email newsletter, a browser extension user interface, mobile app user interface, or other user interfaces that can be delivered through a network.

FIG. 1 is a block diagram of a networked environment 100, according to an embodiment. The networked environment 100 includes a merchant server 102, a network 104, a coupon validation server 106 and a client 108. The merchant server 102 is configured to present an e-commerce shopping experience. The merchant server 102 includes a merchant website 110 and a search database 112. The merchant website 110 includes a homepage 114. The homepage 114 may comprise many different possible landing pages 116. The merchant website 110 also includes a checkout page 118, though some embodiments may have more than one checkout page 118. Some merchant websites 110 provide a box to validate a coupon on each product page 120. The merchant website 110 also includes a variety of other pages 120, such as product pages.

The coupon validation server 106 is coupled to the merchant server 102 via a network 104, such as the internet. The coupon validation server 106 includes a database of coupons to validate 121. The coupon validation server 106 also includes a database of coupon validation results 122. The coupon validation server 106 further includes a database of maps of various merchant websites 124, to be discussed in more detail below. A map is an example of a graph. The coupon validation server 106 also includes spiders 126 and computer robots 128, such as a webbot. The coupon validation server 106 includes website 130 that provides information about coupons. The coupon validation server 106 also includes a coupon response classifier 132. A coupon validation server is an example of a coupon validator.

The client 108 is coupled to both the merchant server 102 and the coupon validation server 106 via the network 104. Network 104 may be any network or combination of networks that can carry data communication. Such a network 102 may include, but is not limited to, a local area network, metropolitan area network, and/or wide area network such as the Internet. Network 102 can support protocols and technology including, but not limited to, World Wide Web (or simply the "Web"), protocols such as a Hypertext Transfer Protocol ("HTTP") protocols, and/or services. Intermediate web servers, gateways, or other servers may be provided between components of the system shown in FIG. 1, depending upon a particular application or environment. Merchant server 102 and coupon validation server 106 can each be implemented in software, firmware, hardware, or a combination thereof. Merchant server 102 and coupon validation server 106 can be implemented on one or more computing devices at the same or different locations. A computing device as used herein can be any type of device having one or more processors and memory. For example, a computing device can be a workstation, mobile device (e.g., a mobile phone, personal digital assistant, tablet or laptop), computer, server, computer cluster, server fare, game console, set-top box, kiosk, embedded system or other device having at least one processor and memory. Merchant server 102 and coupon validation server 106 can be implemented on the same or different computing devices depending upon a particular desired arrangement and the entities involved. In one example, merchant server 102 and coupon validation server 106 can also be implemented on different computing devices, and can each have their functionality distributed across different computing devices depending upon a particular implementation.

Client 108 is a computing device that is under the control of a user and is capable of requesting and receiving resources over network 104. Client 108 can also be implemented in software, firmware, hardware, or a combination thereof on one or more computing devices at the same or different locations. As mentioned above, such a computing device can be any type of device having one or more processors and memory. For example, a computing device for client 108 can be a workstation, mobile device (e.g., a mobile phone, personal digital assistant, tablet or laptop), computer, server, computer cluster, server farm, game console, set-top box, kiosk, embedded system or other device having at least one processor and memory.

The client 108 may be operated by an individual who is considering an online purchase. The client 108 can navigate to the coupon validation website 130 and to the merchant's homepage 114. For example, client 108 can include an application, such as a web browser (or simply browser) through which a user can request resources from a website over network 104. A user requests a resource by typing the website address associated with the resources that is stored on a web server(s) over the web.

Figure 2:
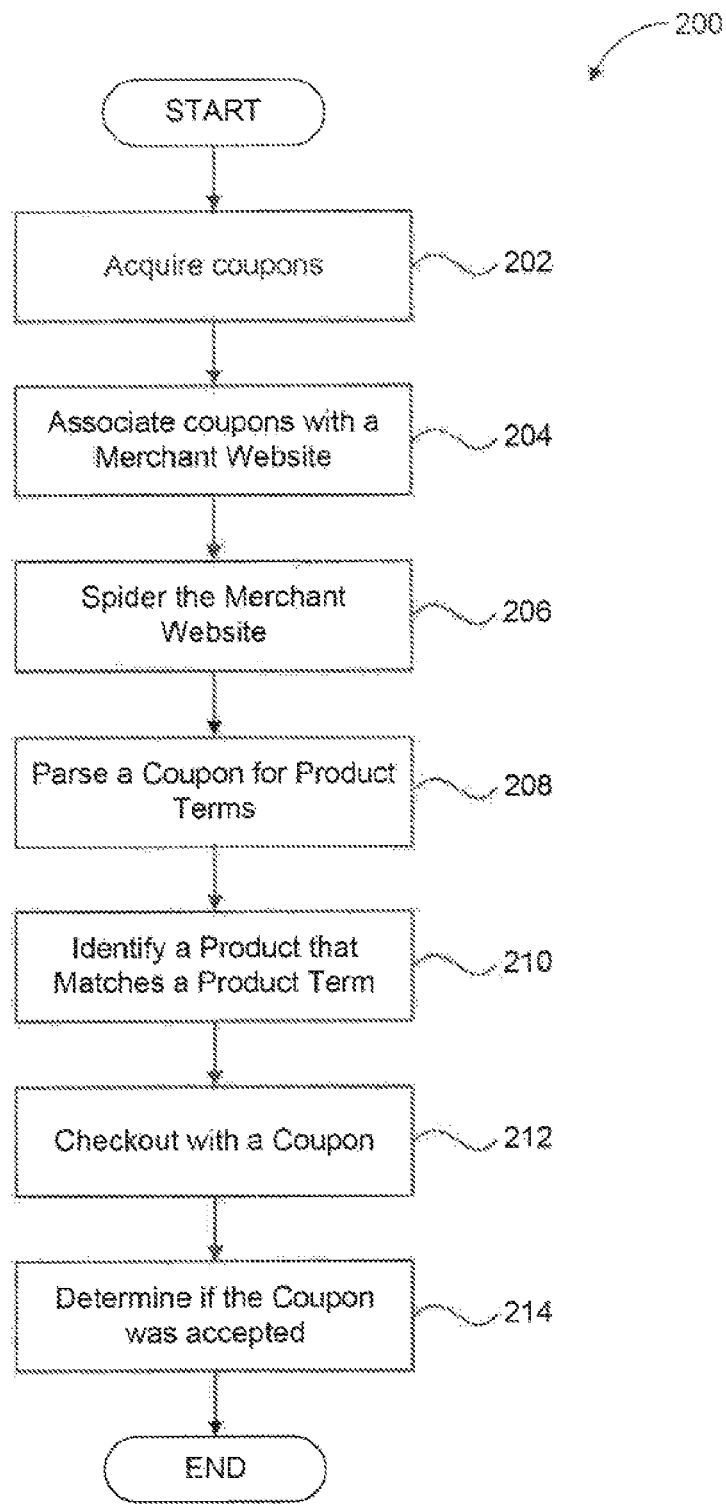
FIG. 2 is a flowchart of a method for processing a third-party online coupon, according to an embodiment.

FIG. 2 is a flowchart of a method 200 for processing a third-party online coupon, according to an embodiment. Stage 202 is to acquire coupons. Coupons may be distributed via retailer websites, social media websites, email newsletters and coupon aggregators, who gather coupon codes and may sell them for a fee or a revenue share. One way to accumulate coupons is for a coupon validation server 106 to execute an email client to receive email newsletters. The coupon validation server 106 may then execute a batch program to filter email newsletters by sender (thus identifying the associated merchant). Another way these coupons may be accumulated is for a coupon validation server to direct a spider 126 to spider websites, such as those from or associated with a merchant (e.g., visiting the Facebook page of Old Navy). When spidering, the spider 126 might search for words associated with promotions, such as "coupon," "deal," "savings," a '%', "off," or others, to identify parts of a webpage that are likely near a coupon. An exemplary spider 126 may have a search module to accomplish this task. One type of candidate for a coupon is text that is in all capital letters, particularly if it is between four and twelve characters in length, i.e., long enough to be unlikely to be guess, but short enough to be memorable and easily typed. Another type of candidate for a coupon is text that is a combination of letters and numbers in one word. Text that has letters in all capitals and numbers in the same word may be a particularly strong candidate to be a coupon. Another type of candidate to be a coupon is a link, as the link may apply a discount once it is followed by a browser on a client 108.

Another approach to gathering coupons may be to join an affiliate program, such as Commission Junction®. One advantage to using an affiliate program is that the coupons are provided in a variety of formats including but not limited to XML, CSV, or accessed through an API. Websites may be able to collect a commission on sales from customers who the website directs to the merchant website 110, and offering a coupon is one way to persuade browsers 108 of a web site to visit the merchant web site 110.

Affiliate programs may also distribute deals and sales. In certain cases, the deal or sale may be an upcoming one, whereas in other cases, the deal or sale may be currently underway. A customer 108 may qualify for a deal or sale at a merchant website 110 by making a qualifying purchase when the deal or sale is active.

Coupon distributors, such as retailers, are often interested in tracking coupon usage to, for example, be able to pay commissions. A successful purchase can be associated with a commission program participant when the participant directs the shopper to the merchant website via a uniform resource locator with tracking data embedded that specifies who should receive the commission. Sometimes the uniform resource locators include a redirect, such as through gan-.doubleclick.net. The redirect allows the server which performs the redirect to place a cookie or perform other types of tracking. Another approach to tracking is to place a cookie on a shopper's computer when they receive the coupon. The merchant may in turn detect the cookie and know that a commission is due. Another approach is for a merchant server 102 to detect the referring website when the user 108 clicks a link on the referring website. Yet another approach is for the website providing the coupons to open a background window, or a pop-up window, when a visitor requests a coupon such that the merchant server 102 may detect this window in order to credit the website that the visitor started at. Combinations of these techniques may also be used. In certain cases, a merchant may pay the commissions directly, in other, a third-party, such as a coupon affiliate program operator, may pay the commissions.

At stage 204, the coupons can be associated with a merchant website 110 by coupon validation server 106. In one example, a spreadsheet or other data structure can be used to store associations between a coupon and a merchant website 110. If the coupons came from an affiliate program, the website where the purchase can be made can be included in a spreadsheet row with the discount code. A coupon validation server 106 may have a parser module to parse the spreadsheet. If the coupon was discovered by a spider 126, the merchant website 110 may be associated with the coupon when the spider 126 reports the coupon to the coupon validation server 106, because the spider 126 likely retrieved the coupon from the merchant's website 110. In other words, if a spider 126 finds a coupon while spidering target.com, the coupon validation server 106 may associate the coupon with Target, the merchant, whose web site is target.com. If a deal code is found in a Bed, Bath and Beyond promotional email, by a batch program on the coupon validation server 106, the coupon could be associated with www.bedbathandbeyond.com (though other systems may have a lookup table such that if a company moved its website, you could find the new uniform resource locator by looking up the company name in the table).

It may be easier to validate a coupon if it has been associated with a merchant website 110, because the association allows the coupon validation server 106 to know where to attempt to validate the coupon. This validation performed by coupon validation server 106 is described with respect to stages 206-214. If the goal is to validate an industrial quantity of coupons, such as millions of coupons or more than a hundred thousand, it may be advantageous to automate the process of validating coupons. One way to automate the process is to validate a coupon with a computer robot 128, dispatched from a coupon validation server 106, that navigates the merchant website 110, and attempts to apply the coupon. Often checkout pages 118 have a button that a user 108 or computer robot 128 can select to see if the coupon is valid. In certain instances, the checkout page 118 may display whether or not a coupon is valid after the user 108 or a computer robot 128 enters a return key, or allows a specified period of time to pass. Certain merchant servers 102 are allowing users 108 to test coupons earlier in the shopping experience, such as when viewing the contents of a shopping cart, to reduce future surprises for customers 108. The computer robot 128 may then process the page returned by the merchant's server 102 to determine if the coupon has been accepted, and is thus valid.

Given enough coupons to process, it may be advantageous to visit a merchant's website 110 with a spider 126 before employing the computer robots 128, in order to find the fastest route through the merchant's website 110 for the computer robots 128 to use. In certain situations, a human operator may manually determine an optimal route and then program this information into a computerized system.

Stage 206 is spidering the merchant website 110. This may start where the coupon validation server 106 directs a spider 126 to visit a home page 114, such as the landing page 116 of the merchant's domain. Upon reaching a page 120, the spider 126 may first determine if it is able to checkout, i.e., exercise a coupon, on that page 120. The spider 126 may then determine the potential exit paths from the current page 120. Often the exit paths will be accessible as links on the page. Other exit paths may be discovered in response to activating page elements, such as a button (e.g., "place in cart"). The spider 126 can use this information to build a graph of the merchant's website 110. The coupon validation server 106 may store the graph in the database of maps of various merchant websites 124.

In certain embodiments, the spider 126 may attempt to traverse the merchant's entire website 110. This may be accomplished using either a breadth first or depth first search of the website 110 according to the graph that the spider 126 builds as it traverses. It may be safe to assume that if a page 120 of the merchant's website 110 is not accessible by following links, it is unlikely to be a checkout page 118. Once the entire website 110 has been spidered, one way to find an optimal route may be to conduct a breadth first search of the graph and stop upon reaching a checkout page 118.

When spidering a merchant website 110, it may be advantageous to avoid creating loops in the graph of the merchant website 110, such that a later traversal of the graph cannot result in traveling in an endless loop. One way to avoid loops when spidering a merchant's website 110 is to not follow an exit path to a webpage 120 that has been previously visited (the spider 126 may return to a webpage after spidering a subsection of the website 110, but not via an exit path. For instance, a spider 126 may find a webpage 120 with three exit paths. After exploring the first exit path, the spider 126 may return to explore the second exit path without creating a loop because the spider 126 will not create a link in the graph back to the webpage 120). More sophisticated algorithms may also be used, such as Kosaraju's algorithm, Tarjan's algorithm and the path-based strong component algorithm.

Another approach to determining a preferred route through a merchant's website 110 is to develop Bayesian networks describing the website 110. Each node in the network could correspond to a page 120 in the website 110, and each edge between nodes could correspond to an exit path. The higher the score applied to the edges, the more optimal the edge, or exit path, is believed to be in quickly reaching a checkout page 118. A spider 126 may thus traverse the merchant's website 110, and then upon reaching a checkout page 118, divide one by the number of edges followed to arrive at the checkout page 118, and add this value to each of the edges (a website 110 where the homepage 114 is also a checkout page 118 is a trivial corner case). Over time, the fastest path to a checkout page 118 is likely to emerge. In certain embodiments, scores may be deprecated over time, for example, discounted by 10% every six months. Such an approach may help the Bayesian network adjust to merchant websites 110 that periodically alter their layout to move checkout pages. Additional disclosure about spidering a merchant's website may be found in U.S. application Ser. No. 13/307,586, filed Nov. 30, 2011 and entitled "Promotion Code Validation Apparatus and Method," which is herein incorporated by reference in its entirety.

It may be advantageous to discover not only if a coupon is valid, but also which products it covers. One way to do this may be for a computer robot 128 to try putting each item available from a merchant's website 110 into a shopping cart and applying the coupon to each item individually and removing the item before adding the next one to the shopping cart. Such an approach may be computationally intensive. It may be advantageous to stop after detecting a product that is covered by the coupon. In another embodiment, it may be desirable to determine all products that the coupon may cover. It may be advantageous to validate coupons against products which are more likely to be covered in an effort to reduce the amount of computational resources (including bandwidth) required. Text that is included in, or associated with, a coupon code is part of the "coupon description," may provide clues as to which products are likely covered by the coupon. An example of a coupon description may be the text provided by a coupon distributor, such as a retailer or coupon aggregator. Another example of a coupon code description may be text that has been laid out around the discount code on a website.

Stage 208 is to parse a coupon for product terms. One approach may be for a coupon validation server 106 to instruct a parser module to parse the coupon's text for product terms, and then direct a computer robot 128 to search the merchant website 110 for the product terms. The parser module may include a lexer to perform a lexical analysis of the coupon text. One embodiment of the coupon validation server 106 may employ a natural language processing module to determine which words in the coupon's text are most likely to be fruitful for searches. Consider the phrase "10% off of all Lego toys in March!" One technique that may be employed by a natural language processing module is to remove noisy words, such as "of," "in", "the", "save", "off" because these terms are so unlikely to be useful keywords. Another technique is to remove words from a corpus, such as terms that are frequently used in describing sales, such as "limited," "only," "today," "hurry," "Black Friday," and various holidays, occasions for gift giving (e.g., graduation), days, months, years or other terms that regularly appear in sales copy. Another technique is for the coupon validation server 106 to reference a database of all known brands, and then instruct the natural language processing module to extract those terms from the coupon description. This way, a natural language processing module can know that Armani® is likely a product term.

Another technique to parse a coupon for product terms that a natural language processing module might be configured to perform may be to perform sentence recognition, to understand which parts of a sentence are most likely to be describing the product. This technique may be performed by a lexer in the natural language processing module. Such a lexer may employ orthographic techniques to identify the sentence, as the author of coupon may not have used a complete sentence. An orthographic technique, in English, includes starting from a capitalized letter and continuing to a full stop, such as a period or exclamation mark (though algorithms are often more complicated, in order to correctly parse abbreviations, for example). Because coupons may not employ periods at the end of a sentence, certain whitespace may be recognized as a full stop. Sentence recognition may seek to identify the subjects and objects of a sentence as these are more likely to be useful keywords in describing the covered product (or product category). The position of a word in the sentence may also play a role.

Another technique to parse a coupon for product terms may be to identify irregular capitalization (because brand names are more likely to be capitalized) or words followed by a registered trademark symbol (®). Though each of the above approaches may be used individually, they may also be used in combination.

Step 210 is to identify a product that matches a product term, such as by a coupon validation server 106. One way to do this is for a computer robot 128 to use a merchant website's search feature to search for corresponding products by entering the product terms as search terms. The product terms may be entered by the computer robot 128 into the merchant's search feature individually or as a group. In certain embodiments, the coupon validation server 106 may have assigned confidence scores to product terms when the product terms were extracted by the parser module, such that the product terms with the highest confidence are searched first. For many merchant websites 110, the search box appears on every page 120. The search box is coupled to the search database 112 and may serve as a gateway interface to allow a client 108 to execute queries against the search database 112. Therefore, the search box may often be found on the homepage 114, without needing to spider the merchant's website 110. Another approach is to use an external search engine, such as Google®, to search for the product terms while restricting the search to the merchant's website 110, perhaps with search terms such as [site:merchant.com legos]. A specialized shopping search engine, such as Froogle® may also be employed.

Once a page of search results 120 has been generated by the merchant server 102, there are additional steps before the computer robot can place the listed search results in a shopping cart on the merchant website 110. One: way to retrieve a page of search results 120 is for a computer robot 128 to download the webpage 120 and pass it to the coupon validation server 106. Another way is for the coupon validation server to download the page of search results 120. The coupon validation server 106 may also retrieve the information from product feeds. In some instances, merchant servers 102, such as Amazon.com, provide product feeds. In other instances, companies like pricegrabber.com provide product feeds. Information that may be of interest to a coupon validation server 106 from a product feed includes the uniform resource location, images of the product, product details, product price, and product specifications. The page of search results 120 may be parsed by a parser module on the coupon validation server 106, or the parser module may be included in a computer robot 128, for links that correspond to search results under the theory that these links lead to product pages 120, where the products can be added to a shopping cart on the merchant website 110. In one embodiment, a different computer robot 128 may be dispatched by the coupon validation server 106 for each product to search. For example, if the product term "soccer" is searched, the merchant server 102 might return a webpage 120 with ten results for "soccer," including items such as soccer balls, soccer jerseys and/or soccer shorts. The coupon validation server 106 may then dispatch ten computer robots 128, each one set to add a different "soccer" product to their respective shopping cart and then validate the coupon against their respective product. If a coupon validates with a given product, the computer robot 128 may report back to the coupon validation server 106 that the coupon it was assigned covers the product that it was assigned.

Stage 212 is for computer robot 128 to check out with a coupon. The computer robot 128 navigates to the checkout page 118, as described above. The computer robot 128 retrieves a copy of the webpage presenting the costs, such as a checkout page 118. The computer robot 128 applies the coupon. In some embodiments, the coupon may already be applied, such as if the computer robot 128 were referred to the merchant's website 110 via uniform resource locator with tracking information associated with a coupon. In some embodiments, the computer robot 128 may enter a coupon code into a textbox on a checkout page 118, and then activate a button or other item to enter the coupon. In certain embodiments, the coupon validation server 106 may have previously provided a coupon code to the computer robot 128 from the database of coupons to validate 121. If the coupon code was not automatically applied, e.g., by way of a referring uniform resource locator, the computer robot 128 saves a copy of the checkout page 118 before the coupon has been applied.

Stage 214 is for a coupon response classifier 132 to determine if the coupon was accepted. The computer robot 128 saves a copy of the checkout page 118 after the coupon has been entered. In one embodiment, the computer robot 128 may process the checkout page 118 itself. In another embodiment, the coupon validation server 106 may process the checkout page 118. One approach to processing the checkout page 118 is to compare the before and after versions. Under this approach, page elements, such as text and images, that are the same in both copies 118 are stripped out by a natural language processing module. A final price may be identified by the coupon validation server 106, such as by searching for the largest number adjacent to a dollar or other currency sign, or for an amount placed near a term such as "price," "total" or an extended line, as is used in arithmetic for summations of a vertical list of summands. Even where a final price cannot be definitively identified, it may be possible to determine if the numbers in the "after" version of the checkout page 118 are lower than the numbers in the same place of the "before" checkout page 118. If so, it may be determined that the coupon was accepted.

Another approach to determining if the coupon was accepted by the merchant server 102 is to search the "after" checkout page 118 for terms or phrases associated with successfully entering a coupon, such as "discount applied," "congratulations," "success," or "new price." Conversely, the checkout page 118 may be searched by a coupon response classifier 132 on the coupon validation server 106 for terms or phrases associated with a coupon that was not entered successfully, such as "sorry," "error," "expired," "unrecognized," or "try again." The technique of searching a checkout page 118 for terms indicating success or failure may be applied by a coupon response classifier 132 to a checkout page 118 even if there. was not a "before" version.

Certain coupon response classifiers 132 may determine more than just if the coupon was accepted. One coupon response classifier 132. may be configured to determine changes in price, such as the total price, the price of a product, shipping price and other amounts that a customer 108 may be charged. Such a coupon response classifier 132 would determine an original price from a "before" checkout page 118. The coupon response classifier 132 may search the source code of a checkout page 118 for a corpus of price related terms, such as "price," "total," "shipping" "tax," "taxes," "subtotal," or "handling." Certain coupon response classifiers 132 may associate the discount with a basis, such as detecting that the discount is a discount on shipping or a particular item. A coupon response classifier 132 may be configured to specifically check for free shipping, such as by searching for a shipping charge that appears in a "before" checkout page 118 but not in an "after" checkout page 118, or by searching for terms such as "free shipping."

A coupon response classifier 132 may have a module to find prices in a checkout page 118, which may be useful for measuring price changes. The coupon response classifier 132 may also search for a dollar sign, or other currency symbol, or may perform regular expression parsing to find a dollar sign followed by a number. Another coupon response classifier 132 may perform regular expression parsing to detect a number followed by a period with two digits following the period, such as $5.00). The coupon response classifier 132 may then compare the values from the "before" and "after" checkout pages 118 to determine a change in price. Another coupon response classifier 132 may search an after page for information regarding an applied discount, such as by searching for '%' or terms such as "discount" or "taken off." Such a coupon response classifier 132 may retrieve nearby numerical values to determine if the "after" checkout page 118 has recorded a percentage discount (likely expressed as two digits followed by a percentage sign) or an amount of a discount, detected as a dollar amount, as discussed herein.

Another coupon response classifier 132 may determine if the "after" checkout page 118 has more items than a "before" checkout page 118, as may be the case where a free gift is included with purchase. Such a coupon response classifier 132 may search for terms such as "item," "added," "free," or "new." Another coupon response classifier 132 may search for new items in an enumerated list, particularly where the layout of the "after" checkout page 118 suggests that the enumerated list is relevant. Examples of relevancy may include being near a detected price, being part of the same hypertext markup language table as the price, being in the primary frame of the checkout page 118 and being in a font associated with checking out, such as bold with dark colors. If no "before" checkout page 118 is available, a coupon response classifier 132 may compare the number of items detected in the "after" checkout page 118 to the number of items the computer robot 128 reported adding to the shopping cart.

In certain embodiments, a checkout page 118 may be marked as "indeterminate," such as if neither the success or failure algorithm produced a reliable result. A coupon validation server 106 may periodically review the "indeterminate" checkout pages 118 to reconsider them, perhaps in light of an updated corpus of terms. In another embodiment, "indeterminate" checkout pages 118 may be reviewed manually. The results, success, indeterminate or failure, may then be stored in the database of coupon validation results 122.

The techniques for processing a third party coupon may also be applied to a coupon being promoted by a coupon validation server 106 on its website 130 where the coupon validation server 106 is operated by the merchant. Presently, merchants may issue coupons but do not have a reliable way of tracking what the parameters for a customer 108 to use the coupon. In such a situation, the coupon validation server 106 could be part of a merchant server 102.

Figure 3:
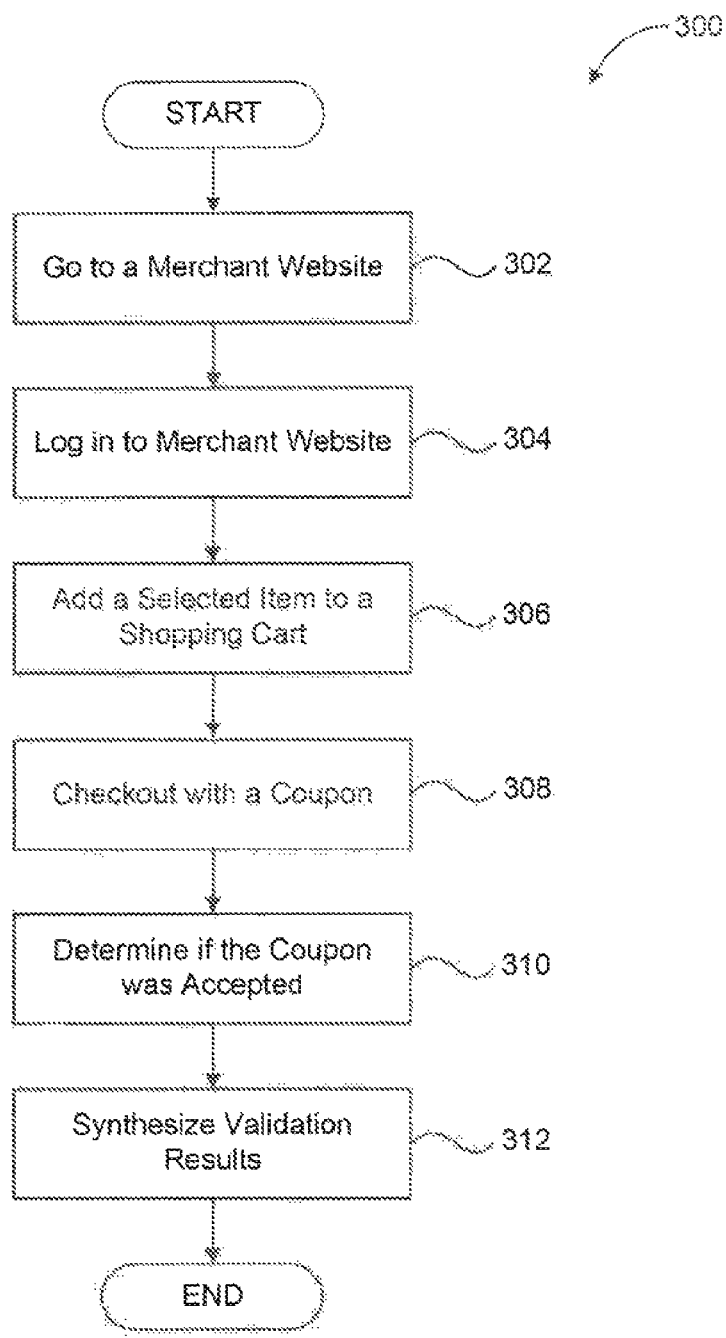
FIG. 3 is a flowchart of a method for a computer robot to validate that a coupon applies to a particular product, according to an embodiment.

Certain embodiments of the method FIG. 2 may not inform a coupon validation server 106 of which products are covered by the validated coupon. The method of FIG. 3 may be used instead of steps 212 and 214 of the method of FIG. 2 so that a coupon validation server 106 may learn additional information about the coupon being validated. FIG. 3 is a flowchart of a method 300 including stages 302-312 that can be carried out by a computer robot 128 to validate that a coupon applies to a particular product, according to an embodiment.

Stage 302 is for a computer robot 128, having been dispatched by a coupon validation server 106, to go to a merchant website 110. It may be advantageous to wait until the page has loaded completely. In one embodiment, the computer robot 128 may opt to not load any images, in order to improve speed and reduce bandwidth consumption.

Stage 304 is for the computer robot 128 to log in to merchant website 110. Logging in to the merchant's website 110 is often necessary to add products to a shopping cart on the merchant website 110. Certain websites allow a "guest checkout," i.e., a shopper can make a purchase without needing to log in, and thus a computer robot 128 can validate a coupon without logging in to the merchant website 110. In such an embodiment, stage 304 is optional. In certain embodiments, a coupon validation server 106 will have instructed the computer robot 128 whether logging in is necessary. In certain embodiments, a coupon validation server 106 will provide customer account details to the computer robot 128 in order to log in.

Stage 306 is for a computer robot 128 to add a selected item to a shopping cart of the merchant website 110. If the computer robot 128 logged in, it may be advisable to clear the shopping cart, to ensure that there is not an item in there from a previous validation effort. As described above, this computer robot 128 may be one of many computer robots 128 tasked with validating that a coupon applies to a variety of products. Therefore, it may be important for this computer robot 128 to put a particular item in its shopping cart such that the coupon validation server 106 can know that the coupon validation result returned by this computer robot 128 corresponds to the intended product. In other words, if the coupon validation server 106 wishes to test 10 products, and assigns 10 computer robots 128 to the task, it is important that each computer robot 128 validate that the coupon applies to the intended product, e.g., the third computer robot 128 validates that the coupon applies to the third product.

The computer robot 128 may have specific instructions as to which product should be added to the shopping cart on the merchant website 110. One way to specify this is for the coupon validation server 106 to provide the computer robot 128 with a search string and a result to select, e.g., search for [superman action figure] and select the fifth result. Another way to specify this is for the coupon validation server 106 to provide the computer robot 128 with a uniform resource locator for the selected product's product page 120. The computer robot 128 could then navigate to the product page 120 and add the displayed item to the shopping cart. After completing this stage 306, the computer robot 128 should be confident that it has one product in its shopping cart, the selected product.

Stage 308 is for the computer robot 128 to checkout from the merchant website 110 with a coupon. Each dispatched computer robot 128 proceeds to the checkout page 118 and attempts to validate the coupon using techniques similar to those described with respect to stage 212.

Stage 310 is for the coupon response classifier 132 to determine if the coupon was accepted by the merchant server 102. The computer robot 128, or the coupon validation server 106, will validate the coupon by determining if it was accepted using techniques similar to those described with respect to stage 214, such as employing a coupon response classifier 132.

Stage 312 is for the coupon validation server 106 to synthesize validation results. Reports from computer robots 128 that have completed a checkout process can be communicated back to the coupon validation server 106. If a coupon response classifier 132 on either the computer robot 128 or the coupon validation server 106 determines that a coupon was not accepted, the coupon validation server 106 may write this information to the database of coupon validation results 122. In scenarios where none of the computer robots 128 find a valid coupon, the coupon validation server 106 may write to the database of coupon validation results 122 that the coupon is invalid, and not proceed to test it further, as few coupons transition from being invalid to valid. In some instances, the coupon validation server 106 may write to the database of coupon validation results 122 that the coupon is invalid for this merchant, but designate that the coupon should be tested at other merchant websites 110, such as those of a competitor.

When a coupon is detected as valid, the coupon validation server 106 may write this information to the database of coupon validation results 122. In another embodiment, the coupon validation server 106 may wait until it has received reports from all of the computer robots 128 before writing a result to the database of coupon validation results 122. One advantage of this approach is that the coupon validation server 106 may be able to detect patterns of the validated versus invalidated coupons to learn, for instance, that the coupon covers all men's clothing, that the coupon is only valid at certain times, that the coupon is only valid on purchases more than $100 or other restrictions on the coupon's use. In other embodiments, the coupon validation server 106 may command other computer robots 128 to cease after a first computer robot 128 successfully uses the commonly assigned coupon, to reduce the required computational resources.

As a final step in synthesizing the coupon validation results, the coupon validation server 106 may update its webpage 130 with the results so that potential shoppers may visit the website 130 to learn the latest validation results, so that they may efficiently receive discounts and other promotions in a hassle free manner.

Figure 4:
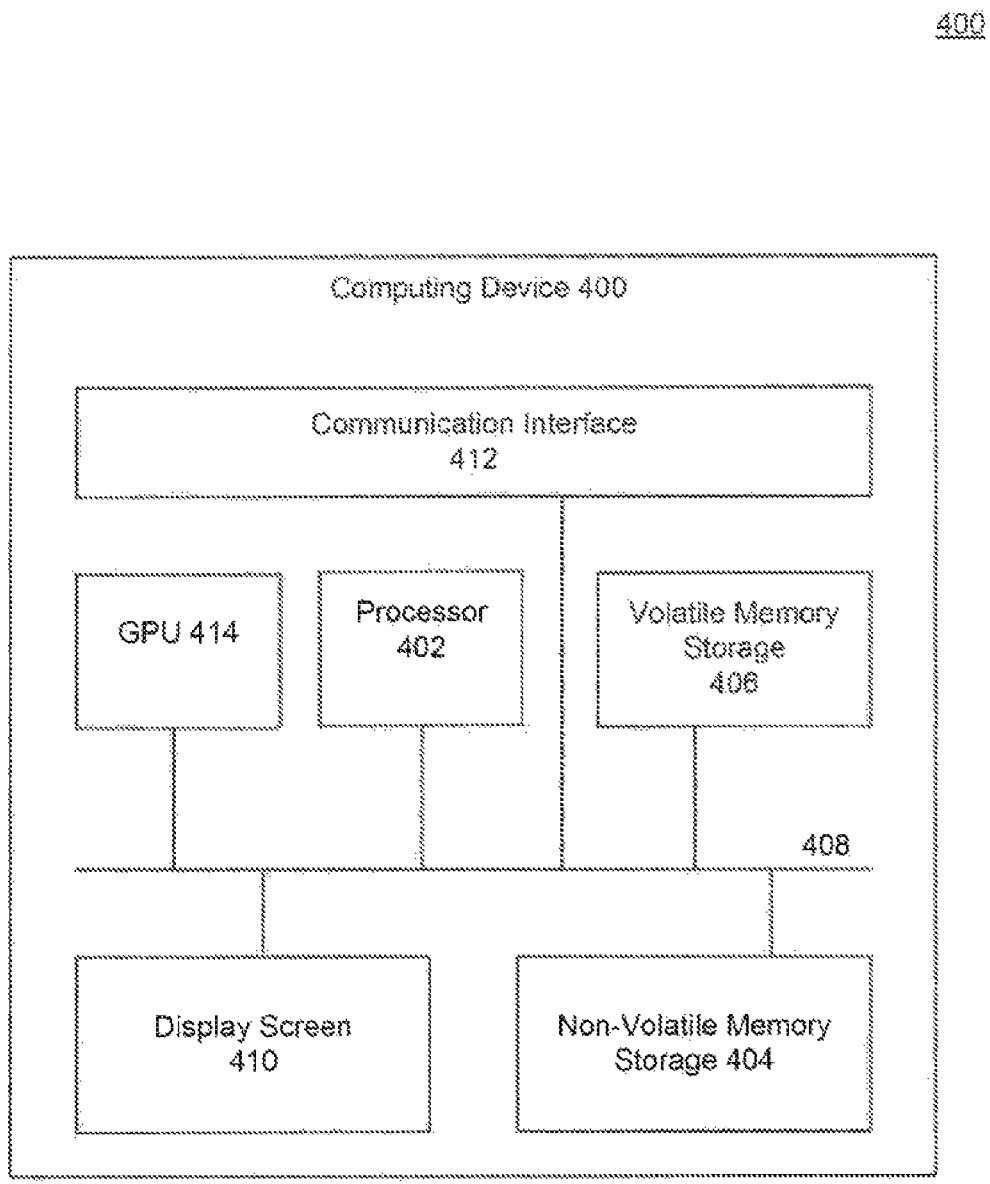
FIG. 4 is a block diagram of a computer system in which embodiments of the invention can be implemented.

FIG. 4 is an example computer system 400 in which embodiments of the present invention, or portions thereof, may be implemented as computer-readable code. For example, the components or modules of networked environment 100, such as the merchant server 102, the coupon validation server 106, the client 108, the spiders 126, the computer robots 128 and other parts may be implemented in one or more computer systems 400 using hardware, software, firmware, or tangible computer-readable media having instructions stored thereon, or a combination thereof and may be implemented in one or more computer systems or other processing systems. Modules and components in FIGS. 1-4 may be embodied in hardware, software, or any combination thereof.

Client 108, merchant server 102 and coupon validation server 106 may include one or more computing devices. Client 108, merchant server 102 and coupon validation server 106 may include one or more processors 402, one or more non-volatile storage mediums 404, one or more memory devices 406, a communication infrastructure 408, a display screen 410 and a communication interface 412.

Processors 402 may include any conventional or special purpose processor, including, but not limited to, digital signal processor (DSP), field programmable gate array (FPGA), and application specific integrated circuit (ASIC). In one embodiment, the processing can be performed entirely by cloud computing services, such as Amazon Web Services R. In other embodiments, only certain portions may be executed in the cloud.

GPU 414 is a specialized processor that executes instructions and programs, selected for complex graphics and mathematical operations, in parallel.

Non-volatile storage 404 may include one or more of a hard disk drive, flash memory, and like devices that may store computer program instructions and data on computer-readable media. One or more of non-volatile storage device 404 may be a removable storage device.

Memory devices 406 may include one or more volatile memory devices such as, but not limited to, random access memory. Communication infrastructure 408 may include one or more device interconnection buses such as Ethernet, Peripheral Component Interconnect (PCI), and the like.

Typically, computer instructions are executed using one or more processors 402 and one or more GPUs 414. Computer instructions can be stored in non-volatile storage medium 404 or memory devices 406. Computer instructions may be stored on a computing device in a compiled file, an executable file or a dynamically linked libraries or objects. Computer instructions may also be compiled on a computing device prior to execution or interpreted on the computing device. In a non-limiting example, computer instructions may be included in a routine, a subroutine, or layers of a software stack that are manipulated by processors 402 or GPUs 414.

Display screen 410 allows results of the computer operations to be displayed to a user or an application developer.

Communication interface 412 allows software and data to be transferred between computer system 400 and external devices. Communication interface 412 may include a modem, a network interface (such as an Ethernet card), a communications port, a PCMCIA slot and card, or the like. Software and data transferred via communication interface 412 may be in the form of signals, which may be electronic, electromagnetic, optical, or other signals capable of being received by communication interface 412. These signals may be provided to communication interface 412 via a communication path. The communications path carries signals and may be implemented using wire or cable, fiber optics, a phone line, a cellular phone link, an RF link or other communication channels.

Embodiments also may be directed to computer program products comprising software stored on any computer-useable medium. Such software, when executed in one or more data processing device, causes a data processing device(s) to operate as described herein. Embodiments of the invention employ any computer-useable or readable medium.

Examples of computer-useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A computer-implemented method of processing third-party online coupons, the method comprising:
  obtaining, with one or more computers, more than a plurality of third-party online coupons;
  parsing text to determine merchants' web sites;
  detecting coupon-code input text boxes of checkout pages of at least some of the merchants' websites by:
    looking up previously specified characterizations of paths through respective merchants' websites in response to navigating to respective merchants' web sites;
    detecting checkout pages by, for each of a plurality of webpages of respective merchants' websites, determining whether respective webpages are checkout pages based on the previously specified characterization of paths through the respective merchants' websites; and detecting coupon-code input text boxes in the checkout pages by, for each of a plurality of elements of document object models of respective checkout pages, determining whether elements are coupon-code input text boxes based on proximity to other elements of the document object models;

parsing at least some of the third-party online coupons to determine product terms, wherein determining product terms comprises:
obtaining a plurality of terms describing a first coupon among the plurality of third-party online coupons,
selecting a subset of the plurality of terms, and
determining which terms of the subset of plurality of terms occur in a database of brands;

searching, with one or more computers, for the product terms;

using the coupon-code input text boxes, automatically testing, with one or more computers, the third-party online coupons with products associated with the product terms and identified in response to searching for the product terms, wherein:
different coupon-testing computer-processes are configured to test at least some of the different subsets concurrent with the other coupon-testing computer-processes by requesting at least some of the merchants' websites to apply at least some of the third-party coupons to at least some of the products, and
at least some third-party coupons are each separately tested against multiple products on a given merchant's web site; and determining, with one or more computers, whether the third-party online coupons apply to at least some of the products based on responses from the merchants' websites and storing at least some results in memory.

2. The computer-implemented method of claim 1, wherein searching comprises searching a different website from the merchants' websites by querying a search engine a given product term with a query that restricts the search results to results corresponding to at least one of the merchants' websites.

3. The computer-implemented method of claim 1, wherein testing distinguishes products for which coupons are valid from products for which those coupons are invalid, the at least some results indicate which third-party online coupons are valid for which products, the coupon-testing computer-processes are computer robots, and the computer robots are configured to automatically test coupon validity.

4. The computer-implemented method of claim 1, further comprising performing the testing step, multiple times, in parallel for multiple products on a given merchants' website related to a given product term.

5. The computer-implemented method of claim 1, wherein parsing the third-party online coupon to determine a product term comprises performing steps for parsing a coupon for a product term.

6. The computer-implemented method of claim 1, wherein at least some of the different coupon-testing computer-processes are configured to test the products against the coupons on the merchants' websites without loading images from the merchants' websites.

7. The computer-implemented method of claim 1, further comprising classifying a response to a third-party online coupon by receiving results from the different coupon-testing computer-processes testing a given third-party online coupon against a plurality of different products on a given merchant's web site and then detecting a pattern of validated versus invalidated coupons.

8. The computer-implemented method of claim 1, further comprising commanding some of the coupon-testing computer-processes to cease after a given coupon-testing computer-process successfully uses a commonly assigned coupon.

9. The computer-implemented method of claim 1, further comprising identifying for which of the products a given coupon is valid at a given merchants' website, and detecting free shipping or determining a change in price associated with a given one of the third-party online coupons, wherein at least some of the coupons are tested by virtual machines, and wherein products to be tested for another given coupon are selected by determining a likelihood that the another given coupon covers the selected products based on text in the another given coupon.

10. The computer-implemented method of claim 1, comprising validating more than a hundred thousand coupons.

11. The computer-implemented method of claim 1, wherein the proximity is proximity to button interaction elements of the document object models of the checkout pages.

12. The computer-implemented method of claim 1, wherein:
proximity is determined based on union of two nodes in graph structures specifying relationships between webpage elements of checkout pages.

13. The computer-implemented method of claim 12, wherein:
proximity is determined based on document-object-model proximity and is independent of layout.

14. The computer-implemented method of claim 1, wherein automated testing of coupons is performed with a browser having a browser extension processing information about third-party online coupons.

15. The computer-implemented method of claim 1, comprising:
reporting an indication of the results to a coupon validation server configured to dispatch coupons for testing.

16. The computer-implemented method of claim 1, wherein:
determining whether the third-party online coupons apply to at least some of the products is performed by virtual machines.

17. The computer-implemented method of claim 1, wherein:
selecting the subset of the plurality of terms comprises selecting a subset of natural language text terms with steps for parsing a coupon for product terms;
the product terms identify merchants at which the coupons are redeemable; and
the third-party online coupons are obtained from an application program interface of an affiliate program.

18. One or more non-transitory, machine-readable media storing instructions that when executed cause one or more computers to effectuate operations comprising:
obtaining, with one or more computers, more than a plurality of third-party online coupons;
parsing text to determine merchants' web sites;
detecting coupon-code input text boxes of checkout pages of at least some of the merchants' websites by:
looking up previously specified characterizations of paths through respective merchants' websites in response to navigating to respective merchants' web sites;

detecting checkout pages by, for each of a plurality of webpages of respective merchants' websites, determining whether respective webpages are checkout pages based on the previously specified characterization of paths through the respective merchants' websites; and detecting coupon-code input text boxes in the checkout pages by, for each of a plurality of elements of document object models of respective checkout pages, determining whether elements are coupon-code input text boxes based on proximity to other elements of the document object models;

parsing at least some of the third-party online coupons to determine product terms, wherein determining product terms comprises:

obtaining a plurality of terms describing a first coupon among the plurality of third-party online coupons, selecting a subset of the plurality of terms, and determining which terms of the subset of plurality of terms occur in a database of brands;

searching, with one or more computers, for the product terms;

using the coupon-code input text boxes, automatically testing, with one or more computers, the third-party online coupons with products associated with the product terms and identified in response to searching for the product terms, wherein:

different coupon-testing computer-processes are configured to test at least some of the different subsets concurrent with the other coupon-testing computer-processes by requesting at least some of the merchants' websites to apply at least some of the third-party coupons to at least some of the products, and at least some third-party coupons are each separately tested against multiple products on a given merchant's web site; and determining, with one or more computers, whether the third-party online coupons apply to at least some of the products based on responses from the merchants' websites and storing at least some results in memory.

19. The one or more media of claim 18, wherein searching comprises searching a different web site from the merchants' web sites by querying a search engine with a query that restricts the search results to results corresponding to at least one of the merchants' websites.

20. The one or more media of claim 18, wherein the operations comprise:

obtaining the previously specified characterizations of paths by spidering at least some of the merchants' websites and selecting routes based on steps for determining preferred routes through the merchants' websites.

21. The one or more media of claim 18, wherein parsing the third-party online coupon to determine a product term comprises performing steps for parsing a coupon for a product term, and, wherein at least some of the different coupon-testing computer-processes are configured to test the products against the coupons on the merchants' websites without loading images from the merchants' websites.

22. The one or more media of claim 18, the operations further comprising classifying a response to a third-party online coupon by receiving results from the different coupon-testing computer-processes testing a given third-party online coupon against a plurality of different products on a given merchant's website and then detecting a pattern of validated versus invalidated coupons.

23. The one or more media of claim 18, the operations further comprising commanding some of the coupon-testing computer-processes to cease after a given coupon-testing computer-process successfully uses a commonly assigned coupon.

24. The one or more media of claim 18, the operations comprising validating more than a hundred thousand coupons.

25. The one or more media of claim 18, wherein the proximity is proximity to button interaction elements of the document object models of the checkout pages.

26. The one or more media of claim 18, wherein:

proximity is determined based on a union of two nodes in graph structures specifying relationships between webpage elements of checkout pages.

27. The one or more media of claim 26, wherein:

proximity is determined based on document-object-model proximity and is independent of layout.

28. The one or more media of claim 18, wherein automated testing of coupons is performed with a browser having a browser extension processing information about third-party online coupons.

29. The one or more media of claim 18, the operations comprising:

reporting an indication of the results to a coupon validation server configured to dispatch coupons for testing.

30. The one or more media of claim 18, wherein:

determining whether the third-party online coupons apply to at least some of the products is performed by virtual machines.

* * * * *